US012331555B2

(12) United States Patent
Grant et al.

(10) Patent No.: US 12,331,555 B2
(45) Date of Patent: Jun. 17, 2025

(54) LOCK MECHANISMS FOR MERCHANDISE SYSTEMS

(71) Applicant: InVue Security Products Inc., Charlotte, NC (US)

(72) Inventors: Jeffrey A. Grant, Charlotte, NC (US); Kyle Baker, Waxhaw, NC (US); Gary A. Taylor, Fort Mill, SC (US); David N. Berglund, Indian Trail, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 18/664,829

(22) Filed: May 15, 2024

(65) Prior Publication Data

US 2024/0301724 A1 Sep. 12, 2024

Related U.S. Application Data

(63) Continuation of application No. 17/338,197, filed on Jun. 3, 2021, now Pat. No. 12,012,781.

(Continued)

(51) Int. Cl.

*E05B 73/00* (2006.01)
*G08B 13/14* (2006.01)

(52) U.S. Cl.

CPC ...... *E05B 73/0017* (2013.01); *G08B 13/1445* (2013.01)

(58) Field of Classification Search

CPC ............. E05B 73/0017; E05B 73/0082; E05B 73/0052; G08B 13/1445; G08B 13/06; G06F 1/1632

See application file for complete search history.

(56) References Cited

U.S. PATENT DOCUMENTS 1,472,206 A * 10/1923 Burkle .................. E05B 67/003 70/DIG. 26
9,443,404 B2 * 9/2016 Grant ................. G08B 13/1445

(Continued)

FOREIGN PATENT DOCUMENTS

WO 2020227513 A1 11/2020

OTHER PUBLICATIONS

"Lock Mechanism for Merchandise Security System", InVue Security Products Inc., Technical Disclosure Commons, Published Nov. 30, 2018. Retrieved from <https://www.tdcommons.org/invue/25>.

(Continued)

*Primary Examiner* — Hoi C Lau

(74) *Attorney, Agent, or Firm* — InVue Security Products Inc.

(57) ABSTRACT

Embodiments of the present invention are directed to merchandise security devices, systems, and methods for displaying and protecting an article of merchandise from theft. In one example, the merchandise security system includes a security device comprising a sensor configured to be secured to the article of merchandise, a cable configured to releasably engage the sensor, and a lock mechanism configured to releasably lock the cable to the sensor in a locked position. The cable is removable from the sensor when the lock mechanism is in an unlocked position. The system also includes a remote device configured to wirelessly communicate with the security device, wherein the remote device is configured to transmit a command to the security device for locking or unlocking the lock mechanism.

27 Claims, 9 Drawing Sheets

Related U.S. Application Data

(60) Provisional application No. 63/131,635, filed on Dec. 29, 2020, provisional application No. 63/035,239, filed on Jun. 5, 2020.

(56) References Cited

U.S. PATENT DOCUMENTS 9,567,776 B2 * 2/2017 Moock ................ E05B 73/0082
9,747,765 B1 * 8/2017 Berglund ........... G08B 13/1409
9,761,101 B2 * 9/2017 Berglund ........... G08B 13/1409
9,805,564 B1 * 10/2017 Berglund ............... B65H 75/48
9,811,988 B2 * 11/2017 Grant ................. G08B 13/1445
9,928,704 B2 * 3/2018 Berglund ........... G08B 13/1463
9,970,217 B2 * 5/2018 Moock ................... G08B 13/06
10,043,358 B1 * 8/2018 Berglund ........... G08B 13/1463
10,068,444 B1 * 9/2018 Berglund ............ E05B 73/0082
10,078,945 B2 * 9/2018 Grant ................. G08B 13/1445
10,098,481 B2 * 10/2018 Berglund ............... G08B 13/14
10,111,537 B2 * 10/2018 Johnston ................... A47F 7/00
10,227,796 B2 * 3/2019 Moock ................... G08B 13/06
10,290,192 B2 * 5/2019 Grant ................. G08B 13/1445
10,403,105 B2 * 9/2019 Berglund ............. B65H 75/265
10,475,308 B2 * 11/2019 Grant ................. G08B 13/1445
10,529,201 B2 * 1/2020 Grant ................. G08B 13/1445
10,559,176 B2 * 2/2020 Berglund ............ E05B 73/0082
10,738,508 B2 * 8/2020 Moock ................ E05B 73/0082
10,918,224 B2 * 2/2021 Johnston ................... A47F 7/00
11,037,417 B2 * 6/2021 Grant ................. G08B 13/1445
11,236,528 B2 * 2/2022 Berglund ............ E05B 73/0082
11,259,653 B2 * 3/2022 Johnston ................. A47F 7/024
11,293,202 B2 * 4/2022 Moock ................ E05B 47/0012
11,399,640 B2 * 8/2022 Berglund ............ E05B 73/0082
11,401,738 B1 * 8/2022 Kelsch ................ E05B 47/0012
11,450,185 B2 * 9/2022 Helman ............. G08B 13/1463
11,459,800 B2 * 10/2022 Carreon .............. E05B 73/0029
11,737,582 B2 * 8/2023 Johnston ................... A47F 7/00
248/542
11,753,852 B2 * 9/2023 Moock ................... G08B 13/06
340/568.3
2005/0099262 A1 * 5/2005 Childress ................. G07C 9/21
340/5.6
2012/0227447 A1 * 9/2012 Conti .................. E05B 73/0052
29/407.01
2014/0060218 A1 * 3/2014 Bisesti ................... F16M 11/04
248/274.1
2015/0235533 A1 * 8/2015 Grant ................. G08B 13/1445
340/568.2
2016/0163167 A1 * 6/2016 Fawcett ................. G08B 13/14
340/568.2
2016/0201359 A1 * 7/2016 Berglund ........... G08B 13/1472
70/58
2016/0235217 A1 * 8/2016 Johnston ................... A47F 7/00
2016/0335859 A1 * 11/2016 Sankey .................. G05B 15/02
2016/0379455 A1 * 12/2016 Grant ................. G08B 13/1445
340/568.2
2017/0236353 A1 * 8/2017 Conrad .............. G07C 9/00571
713/185
2017/0249814 A1 * 8/2017 Berglund ............ E05B 73/0082
2018/0033268 A1 * 2/2018 Berglund ............ E05B 73/0082
2018/0061197 A1 * 3/2018 Grant ................. G08B 13/1445
2018/0240315 A1 * 8/2018 Berglund ........... G08B 13/1463
2018/0340357 A1 * 11/2018 Carreon .............. E05B 73/0029
2018/0365948 A1 * 12/2018 Grant ................. G08B 13/1445
2019/0012889 A1 * 1/2019 Berglund ............ E05B 73/0082
2019/0029446 A1 * 1/2019 Berglund ............ E05B 73/0082
2019/0059612 A1 * 2/2019 Johnston ................... A47F 7/00
2019/0244494 A1 * 8/2019 Grant ................. G08B 13/1445
2019/0272731 A1 * 9/2019 Fawcett ............. G08B 13/2482
2020/0141159 A1 * 5/2020 Berglund .................. A47F 5/02
2020/0178704 A1 * 6/2020 Johnston ................. A47F 3/004
2020/0332566 A1 * 10/2020 Carreon ................ E05B 45/005
2021/0140202 A1 * 5/2021 Hall .................... G08B 13/1463
2021/0381282 A1 * 12/2021 Grant .................. E05B 73/0005
2022/0145672 A1 * 5/2022 Berglund ............. F16M 11/105
2022/0268061 A1 * 8/2022 Kelsch ..................... E05B 41/00
2022/0322847 A1 * 10/2022 Berglund ................ A47F 7/024
2022/0325562 A1 * 10/2022 Kelsch ..................... E05B 41/00
2023/0407684 A1 * 12/2023 Moock .................. G06F 1/1632

OTHER PUBLICATIONS

The International Search Report and The Written opinion from corresponding International Application No. PCT/US21/35821, dated Sep. 29, 2021 (12 pages).

* cited by examiner

LOCK MECHANISMS FOR MERCHANDISE SYSTEMS

CROSS REFERENCE TO RELATED APPLICATIONS

This application is a continuation of U.S. patent application Ser. No. 17/338,197, filed on Jun. 3, 2021, which is a non-provisional of and claims the benefit of priority to U.S. Provisional No. 63/131,635, filed on Dec. 29, 2020, and to U.S. Provisional No. 63/035,239, filed on Jun. 5, 2020, the entire contents of which are hereby incorporated by reference.

FIELD OF THE INVENTION

Embodiments of the present invention relate generally to security devices, systems, and methods for displaying articles of merchandise in a retail environment.

BACKGROUND OF THE INVENTION

Retailers routinely display articles of merchandise, such as telephones, portable computers (e.g. notebooks, laptops, tablets, etc.), e-readers, media players, and the like for customers to evaluate before making a purchase. Such merchandise is vulnerable and susceptible to theft. Accordingly, these articles of merchandise need to be secured from theft.

BRIEF SUMMARY

Embodiments of the present invention are directed towards systems, devices, and methods for displaying articles of merchandise in a retail environment. In one embodiment, a system includes a merchandise security system for displaying and protecting an article of merchandise from theft. The security system includes a security device and an electronic device. The security device includes a sensor configured to be secured to the article of merchandise and to detect a security event. The security system further includes a cable configured to releasably engage the sensor and a lock mechanism, wherein the cable or the article of merchandise is removable from the sensor when the lock mechanism is in an unlocked position. The electronic device is configured to wirelessly communicate with the security device, wherein the electronic device is configured to transmit a command to the security device for locking or unlocking the lock mechanism.

In another embodiment, a method for displaying and protecting an article of merchandise from theft is provided and includes securing a sensor to the article of merchandise, the sensor configured to detect a security event. The method also includes connecting a cable to the sensor and locking the cable to the sensor with a lock mechanism in a locked position. The method further includes moving the lock mechanism from the locked position to an unlocked position in response to receiving a wireless command from an electronic device for removing the cable from the sensor or removing the article of merchandise from the sensor.

In one embodiment, a system includes a merchandise security system for displaying and protecting an article of merchandise from theft. The security system includes a security device and an electronic device or remote device. The security device includes a sensor configured to be secured to the article of merchandise. The security system further includes a cable configured to releasably engage the sensor and a lock mechanism, wherein the cable is removable from the sensor when the lock mechanism is in an unlocked position. The electronic device or the remote device is configured to wirelessly communicate with the security device, wherein the electronic device or remote device is configured to transmit a command to the security device for locking or unlocking the lock mechanism.

In another embodiment, a method includes securing a sensor to the article of merchandise and connecting a cable to the sensor to establish electrical communication therebetween. The method further includes locking the cable to the sensor with a lock mechanism in a locked position and moving the lock mechanism from the locked position to an unlocked position in response to receiving a wireless command from an electronic device or a remote device for removing the cable from the sensor.

DETAILED DESCRIPTION OF EMBODIMENTS OF THE INVENTION

One or more embodiments of a merchandise security device, system, and method for displaying an article of merchandise are shown in the accompanying drawing figures and described below. The article of merchandise is typically a display model or an operational sample of electronic merchandise, such as portable telephones, smart phones, computers (e.g. notebooks, laptops, tablets, etc.), e-readers, media players, and the like, for a customer to examine before making a decision whether to purchase the article. The article of merchandise is typically displayed in a manner that permits a prospective purchaser to evaluate the operation and features of the merchandise, while protecting the merchandise from theft. In one embodiment, a security device includes a sensor and a cable, where the sensor may be attached to the article of merchandise for detecting various security events or alarming conditions, such as the article being removed from the sensor. The cable may be operably engaged with the sensor at one end, while the opposite end may be secured to a recoiler. As explained in further detail below, the sensor may also be configured to detect a security event or an alarming condition of the cable, such as a cutting, severing, removing, or detaching of the cable. As also explained in detail below, the security device may be configured to communicate with one or more electronic devices (e.g., a remote device or key) for controlling the security device, such as for locking or unlocking a lock mechanism.

Figure 1:
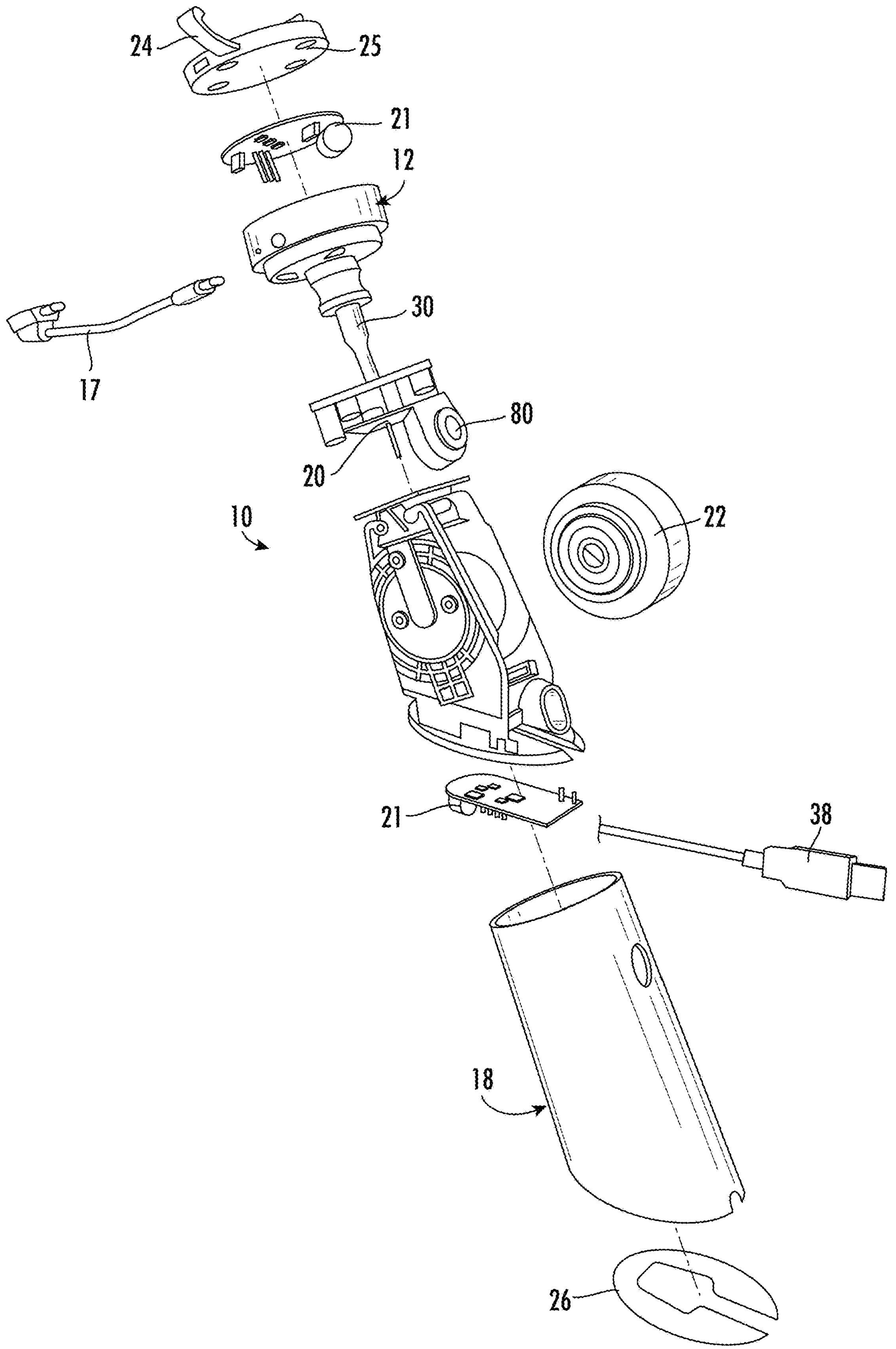
FIG. 1 is an exploded view of a security device according to one embodiment of the present invention.
Figure 5:
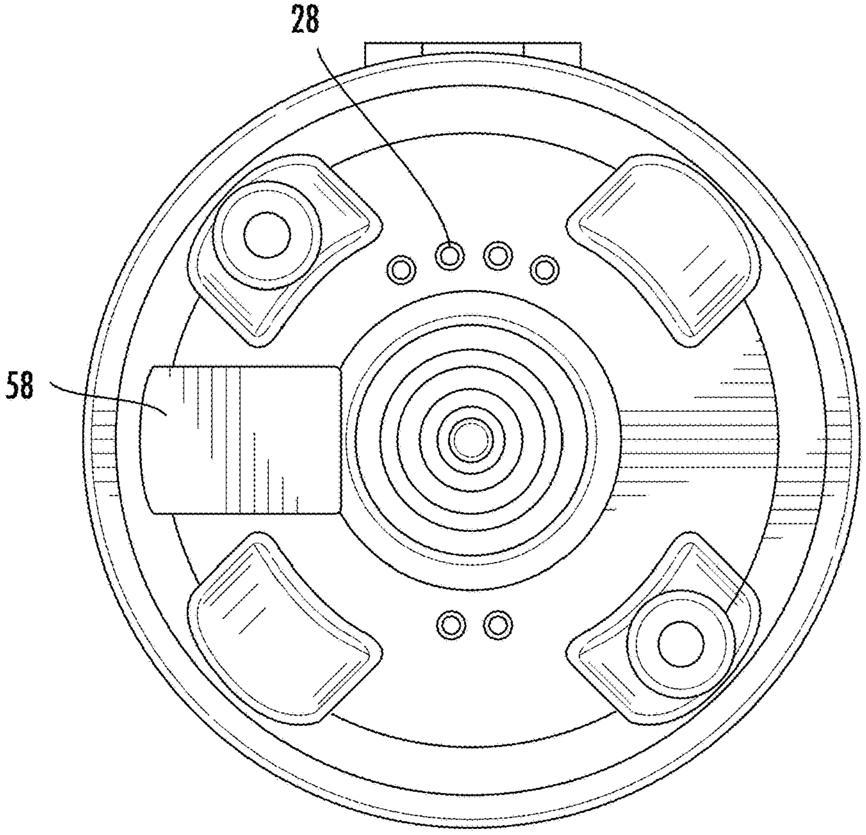
FIG. 5 is a bottom view of the sensor shown in FIG. 4.
Figure 6:
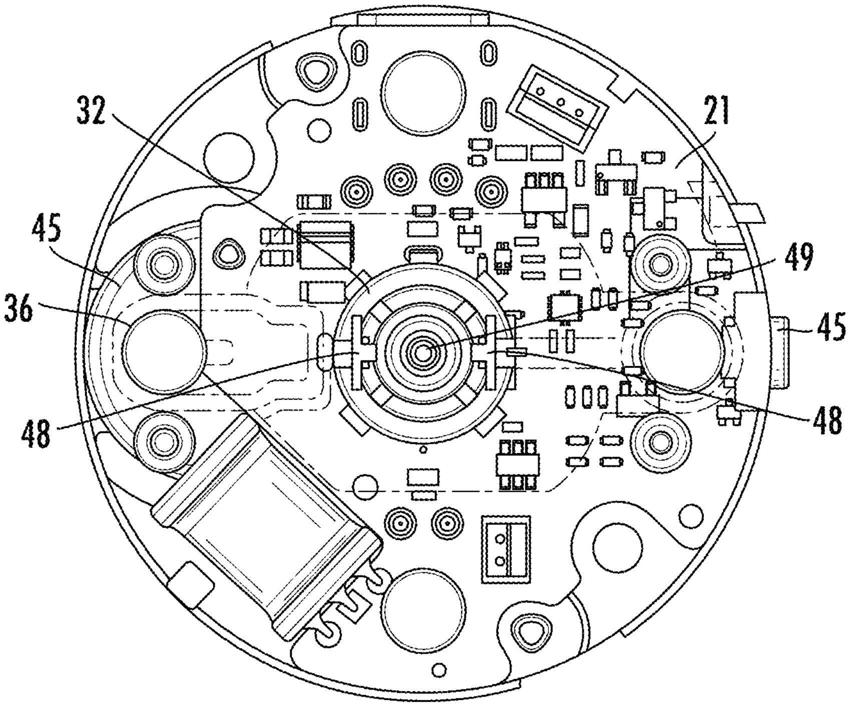
FIG. 6 is a partial view of the sensor shown in FIG. 4.

According to one embodiment shown in FIG. 1, a merchandise security device 10 generally comprises a sensor 12 configured to be secured to an item of merchandise. The sensor 12 may be electrically connected to a connector 17 that is configured to electrically connect to an input jack of the item of merchandise. The security device 10 may also include a base 18 that is configured to removably support the sensor 12 and the item of merchandise thereon. In some embodiments, the base 18 and the sensor 12 include one or more contacts 28, 40 for facilitating contact charging when the sensor is supported on the base (see, e.g., FIGS. 2 and 5). In one embodiment, the security device 10 also includes a cable 20 that is coupled to the sensor 12 at one end and operably engaged with a recoiler 22 at an opposite end. As explained in further detail below, in some embodiments, a sense circuit or loop may be defined through the cable 20 and the sensor 12, and the sense loop may be used to detect various security events associated with the cable 20, such as the cable being cut, shorted, and/or disconnected. The security device 10 may also include a charging circuit for charging of the item of merchandise and/or a power source carried by the sensor 12 and/or the base 18. The sensor 12 may also be used to detect security events associated with the sensor and/or the item of merchandise, such as the item of merchandise being removed from the sensor.

Figure 9:
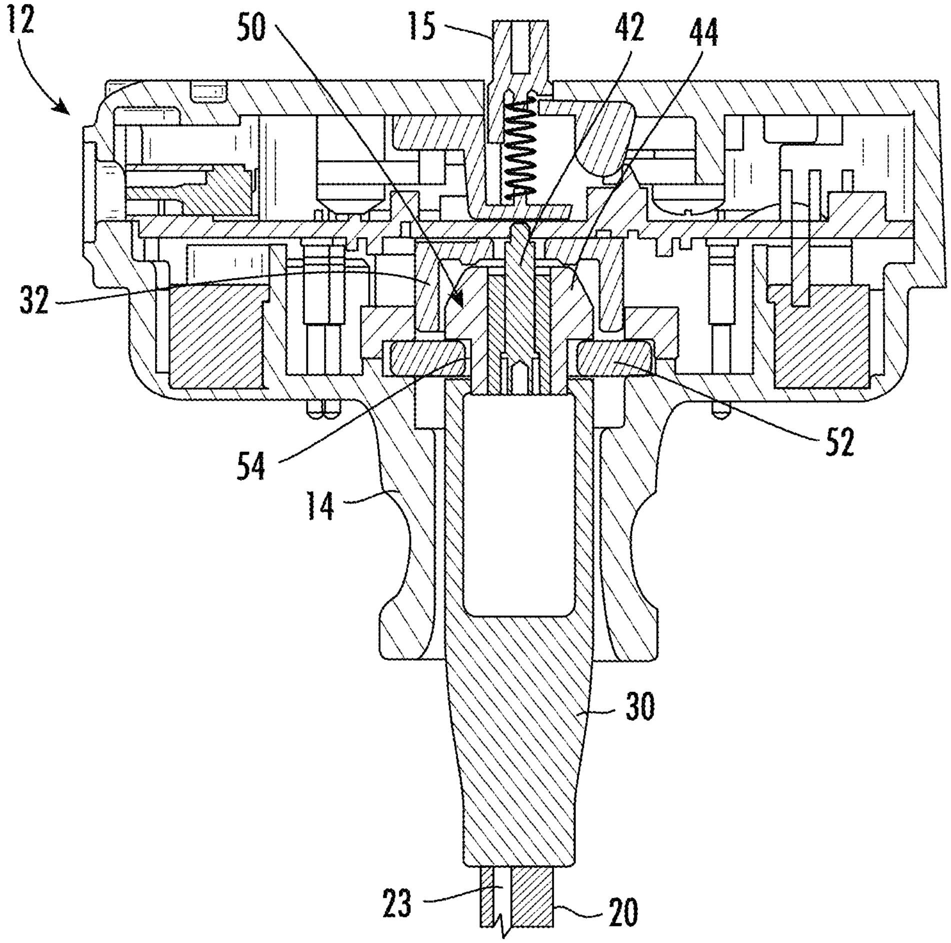
FIG. 9 is a cross-sectional view of a sensor according to one embodiment of the present invention.
Figure 10:
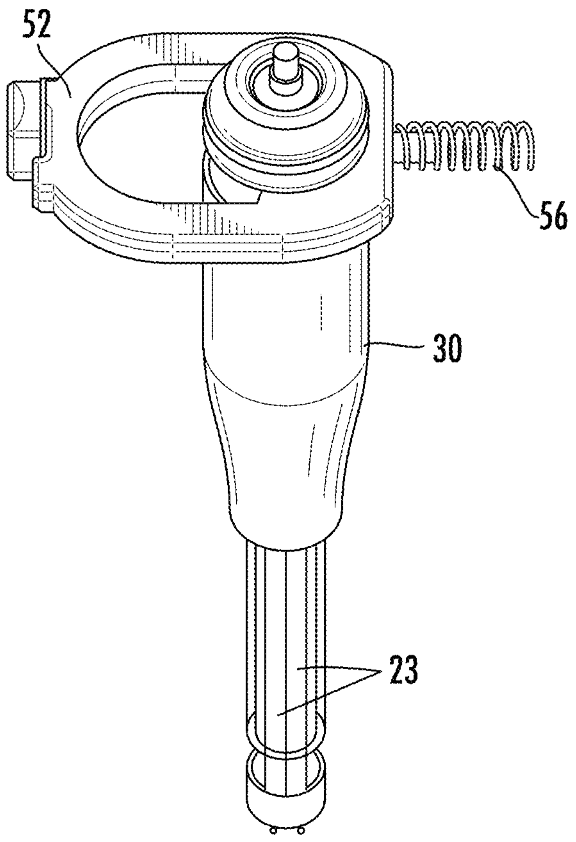
FIG. 10 is a perspective view of a connector in engagement with a movable member according to one embodiment.
Figure 11:
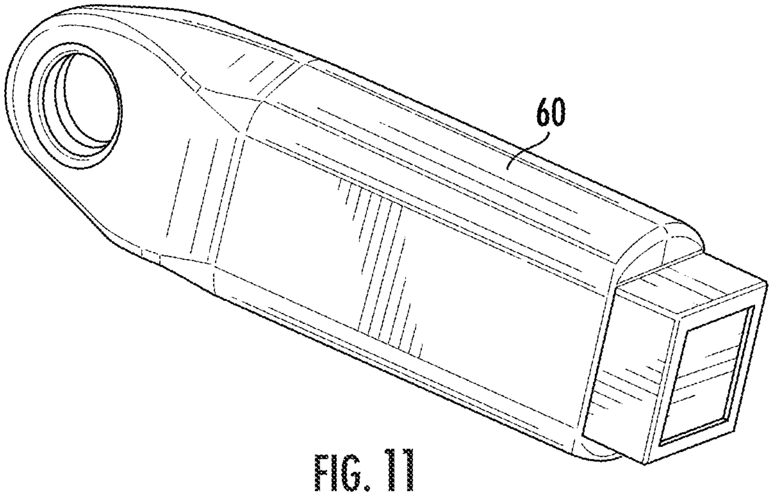
FIG. 11 is a perspective view of a key according to one embodiment.

The sensor 12 may be secured to the item of merchandise using any desired technique, such as an adhesive and/or mechanical brackets 24. For instance, FIG. 1 shows mechanical brackets 24 that may be attached to the sensor 12 with a plate 25 using fasteners. The sensor 12 may have a variety of shapes and sizes for being secured to the item of merchandise. In one embodiment shown in the cross-sectional view of FIG. 9, the sensor 12 may include a sensing device 15, such as a pressure or plunger switch, for detecting removal of the item of merchandise. In addition, the connector 17 may be configured to be removably inserted into the input jack of the item of merchandise. Thus, the sensor 12 and the item of merchandise may be electrically connected via the connector 17. The sensor 12 may include a printed circuit board (PCB) 21, circuitry, or the like. For example, the sensor 12 may include charging circuitry for facilitating power transfer between the base 18 and the item of merchandise. The connector 17 may be electrically connected to the PCB 21. In the illustrated embodiment, the connector 17 is mounted to and extends from the sensor 12 but could be positioned at other locations depending on the location of the input port of the item of merchandise.

As noted above, the sensor 12 may include one or more electrical contacts 28. In some embodiments, the sensor 12 includes a plurality of electrical contacts 28. The electrical contacts 28 may be in electrical communication with the PCB 21 in the sensor 12 and the connector 17. Alternatively, the electrical contacts 28 may be electrically connected to only the connector 17. In some embodiments, the sensor 12 may not supply power to the item of merchandise when the item is lifted from the base 18. Rather, the item of merchandise may operate using its own power source when lifted from the base 18.

The base 18 may be configured to be supported by a fixed support or display surface, such as a counter, shelf, fixture, or the like. The base 18 may be secured to the support surface 25 using any desired technique such as an adhesive 26, brackets, and/or fasteners. The base 18 may include one or more magnets 34 or magnetic material, and the sensor 12 may include one or more complementary magnets 36 or magnetic material for releasably holding the sensor on the base. The magnets 34, 36 may aid in aligning the item of merchandise in a desired display orientation.

The security device 10 may include a recoiler 22 and a cable 20 as discussed above. The base 18 may include an opening for receiving the cable 20. As such, the cable 20 may be extended through the opening when the sensor 12 and the item of merchandise are lifted from the base, and the cable may be retracted through the opening when the sensor and the item of merchandise are returned to the base. The recoiler 22 may be spring biased in some embodiments such that the cable 20 is automatically retracted within the recoiler. The recoiler 22 may be housed within the base 18 and mounted on top of a support surface (see, e.g., FIG. 1), although in other embodiments, the recoiler may be mounted to an underside of the support surface. Furthermore, the recoiler 22 may be in electrical communication with the cable 20. In this regard, the cable 20 may include one or more electrical conductors 23 extending along the length of the cable. In some cases, the cable 20 may include a pair of conductors 23 for defining a sense loop or circuit and conducting an electrical signal. In other cases, the cable 20 may include a single conductor 23, such as an optical conductor for conducting an optical signal (e.g., a fiber optic cable). Moreover, in other embodiments, a recoiler 22 may be omitted, such as in the case where an elastic or helical cable 20 is utilized.

Figure 4:
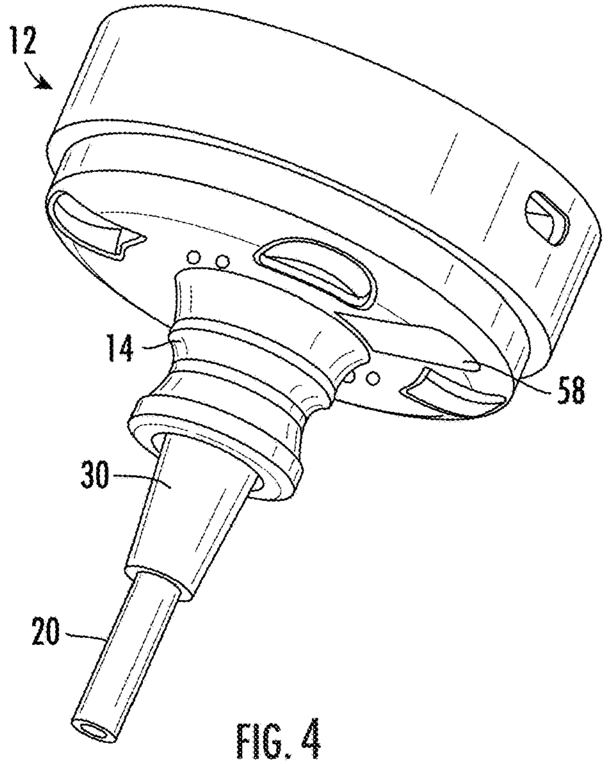
FIG. 4 is a perspective view of a sensor of a security device according to one embodiment.

Should the sense loop be interrupted, the base 18 or other alarm unit may detect the interruption and generate an alarm signal. For example, the base 18 or other alarm unit may be configured to generate an audible and/or a visible alarm. The sensor 12 may likewise or alternatively include an alarm 45 for generating an audible and/or a visible alarm. The sensor 12 and/or the base 18 may be configured to be armed and/or disarmed via a key, such as a wireless key having a code that must match a code stored by the sensor and/or the base. For instance, FIG. 4 shows that the sensor 12 may include a port 45 for facilitating communication with a key.

As discussed above, the base 18 may include one or more electrical contacts 40. The contacts 28, 40 of the base 18 and the sensor 12 are configured to align with one another and contact one another when the sensor is supported on the base. Thus, the base 18 and the sensor 12 are in electrical communication with one another when the sensor is supported on the base. The base 18 may be electrically connected to a power source with a connector 38 that is configured to provide power to the base and/or the one or more electrical contacts 40 in the base. The base 18 may include one or more printed circuit boards (PCB) 21, circuitry, or the like for facilitating power transfer. The base 18 may also include charging circuitry that is configured to facilitate power transfer from the external power source 38 and the electrical contacts 40. Thus, when the sensor 12 is supported on the base 18, power is able to be transferred between the contacts 28, 40 and to the sensor 12. The connector 17 is electrically connected to the sensor contacts 28 as power is delivered such that power is provided to the item of merchandise. Therefore, the item of merchandise may be powered by power transferred thereto and may be used to charge a battery associated with the item of merchandise. In some embodiments, any voltage adaption occurs prior to being delivered to the sensor 12. Voltage adaption may be needed in order to accommodate different items of merchandise that require different operating voltages. Any voltage adaption may occur prior to power being provided to the contacts 28 on the sensor 12. Thus, the sensor 12 and connector 17 do not provide any voltage adaption. However, in other embodiments, the sensor 12 may include a resistor or other identifier that detects the voltage requirements of the item of merchandise which provides a signal to the sensor or the base 18 for adjusting the voltage as necessary before providing power to the article. Although the aforementioned embodiments describe that power may be transferred via contact charging, it is understood that other techniques could be used to transfer power to sensor 12 and the item of merchandise. For example, inductive charging functionality could be employed for transferring power. Moreover, in some cases, the cable 20 may include one or more conductors 23 for transferring power to the sensor 12 and/or the item of merchandise.

Figure 2:
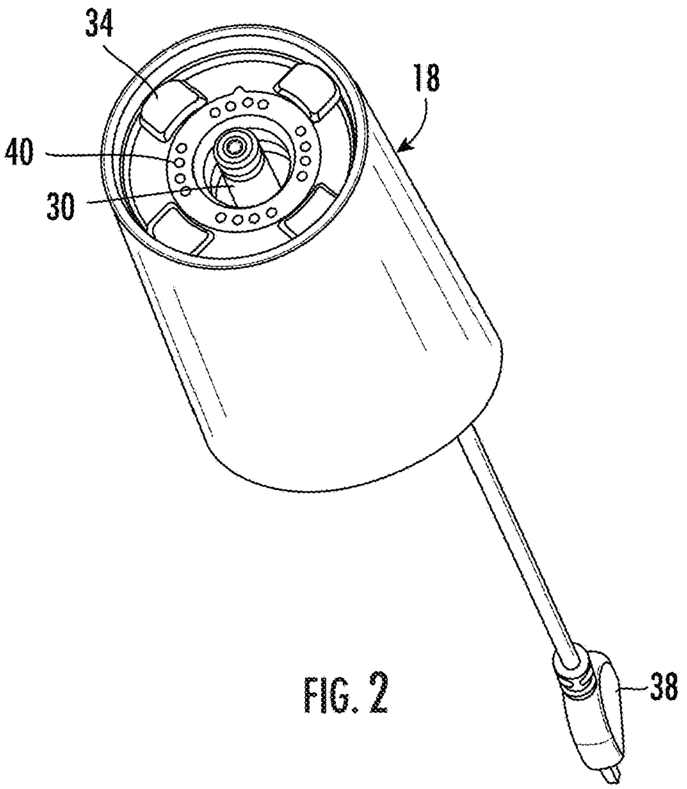
FIG. 2 is a perspective view of a base of a security device according to one embodiment.

In some cases, the base 18 and the sensor 12 may include an electrical contact 28, 40 that detects that the sensor is lifted off of the base. For example, the sensor 12 and base 18 may each include a contact 28, 40 that is configured to engage one another when the sensor is supported on the base. These contacts 28, 40 may not transfer power. However, the contact on the base 18 may communicate with the PCB to indicate when the sensor 12 has been lifted off of the base and to cease transferring power to the electrical contacts 28, 40. This arrangement of contacts 28, 40 may reduce arcing and power surges when the sensor 12 is placed back on the base 18 since power will no longer be transferred to the contacts on the base after the sensor is lifted. Moreover, the base 18 and the sensor 12 may include an electrical contact 28, 40 that facilitates power transfer as discussed above, as well as for utilizing the USB Power Delivery (PD) specification for providing power to the item of merchandise. Thus, in some embodiments, the sensor 12 and base 18 may each have four electrical contacts (e.g., power, ground, PD, and lift detection). Additional contacts 28, 40 may be provided for redundancy to allow for rotation of the sensor 12 on the base 18 while maintaining electrical communication. For example, FIG. 2 shows that the base 18 may include four sets of four contacts to allow for electrical communication to be maintained as the sensor 12 is seated on the base at different orientations.

Figure 3:
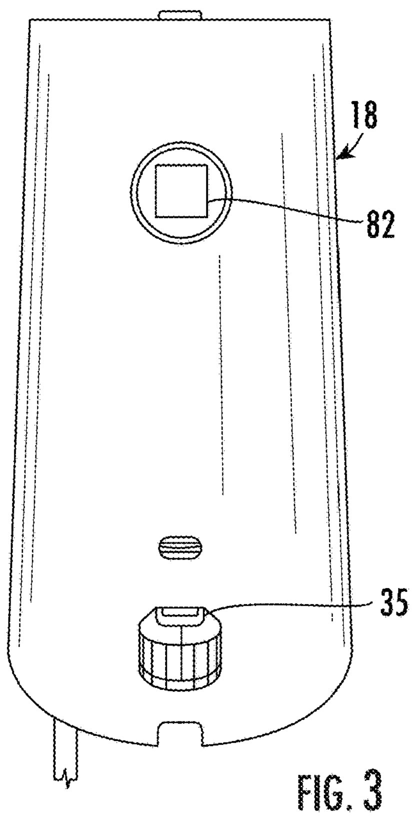
FIG. 3 is a rear view of the base shown in FIG. 2.

Furthermore, the base 18, 18' may include one or more auxiliary ports 35 for connecting to corresponding auxiliary devices for the item of merchandise (see, e.g., FIG. 3). Thus, in addition to securing an item of merchandise and electrically connecting to a power cord 38 and associated input power source, the base 18 may be configured to electrically connect to an auxiliary device, such as, for example, an auxiliary device for the item of merchandise on display (e.g., a stylus, speaker, keyboard, Bluetooth device, etc.). The auxiliary port 35 may be an input port (e.g., a micro-USB port) that is configured to receive a corresponding input connector that is electrically connected to the auxiliary device. When the input connector is connected to the auxiliary port 35, the auxiliary port may be configured to receive power, if necessary, and/or define a sense loop that may be used to detect various security events associated with the auxiliary device, such as the input connector being removed from the base 18 in an unauthorized manner. The auxiliary port 35 may be part of the same sense loop defined with the sensor 12 and the cable 20, or may define a separate sense loop. In the instance where the auxiliary port 35 is configured to provide power, the charging circuit may be configured to determine the power requirements of the auxiliary device and provide the necessary power level to effectuate charging. In some cases, the charging circuit may be configured to reduce the amount of power being provided to the sensor 12 and/or the item of merchandise so that power may be provided to the auxiliary device while still facilitating charging of the sensor and/or the item of merchandise. Therefore, the auxiliary port 35 allows an auxiliary device to be displayed and used by a prospective consumer in connection with an item of merchandise, while the retailer is able to also power and protect both the item of merchandise and the auxiliary device from theft with a single security device rather than requiring two separate security devices.

It is understood that the cable 20 may be any suitable cord, tether, or the like. In addition, the cable 20 may include one or more electrical conductors 23 for transmitting electrical, security, and/or communication signals. Alternatively, the cable 20 may be purely mechanical in other embodiments. In addition, the cable 20 may be a single strand, multi-strand, or braided. The cable 20 may be flexible to facilitate extension and retraction relative to the recoiler 22, and in some embodiments, may be formed of a cut-resistant material. Furthermore, the cable 20 may have various cross sections, such as round or flat. In the case where power is facilitated through electrical contacts 28, 40, the cable 20 may have a pair of conductors 23 for defining the sense loop and/or for transferring data.

In one embodiment, an end of cable 20 may be electrically connected to the sensor 12. In one embodiment, the sensor 12 may be configured to releasably engage an end of the cable 20. The end of the cable 20 may include a releasable connector 30 that is configured to be received by a receptacle 32 on the sensor 12. The sensor 12 may include a cylindrical portion 14 that extends axially from a rear surface of the sensor. This cylindrical portion 14 may be configured to receive at least a portion of the connector 30. In some embodiments, the connector 30 includes one or more electrical contacts for electrically connecting to one or more electrical contacts on the sensor 12. For example, the connector 30 may include a plurality of contacts, e.g., one contact 42 at the end of the connector (e.g., a spring-biased pogo pin) and another contact 44 that surrounds the contact 42 (e.g., a hemispherical, rounded, or frustroconical shaped contact). The connector 30 may be assembled such that the contacts 42 and 44 are electrically insulated from one another. The sensor 12 may also include a plurality of contacts 48, 49, wherein the receptacle 32 includes at least one contact 48, and another contact 49 is electrically connected to the PCB 21. In some cases, a pair of radially opposed contacts 48 may be provided in the receptacle 32, which may ensure electrical communication with the connector 30. The contact 42 is configured to mate with and engage the contact 49, while contact 44 is configured to mate with and engage contact(s) 48.

Furthermore, the end of the cable 20 may be coupled to the sensor 12 using a variety of techniques and may be configured to rotate or swivel in some embodiments. In one example, the electrical contacts 42, 44 of the connector 30 may be configured to rotate or swivel relative to the contacts 48, 49 on the sensor 12 while maintaining a mechanical and an electrical connection. As discussed above, the cable 20 may include a plurality of conductors 23 and these conductors may define a sense loop. One conductor 23 may be connected to contact 42, while another conductor 23 may be connected to contact 44. Thus, when the connector 30 is engaged with sensor 12, the electrical connection therebetween forms a detectable sense loop formed with the conductors 23 in the cable and the electrical contacts 42, 44, 48, 49 between the connector and the sensor. Typically the connector 30 and sensor 12 would maintain electrical contact when the sensor is lifted off of the base, although it is contemplated that in alternative embodiments that the connector and sensor may electrically disconnect when the sensor is lifted off of the base, such as due to tension being applied to the cable 20. This latter embodiment may reduce wear on the electrical contacts and friction for swiveling between the connector 30 and the sensor 12.

In one embodiment, a lock mechanism 50 may be provided for locking the end of the cable 20 to the sensor 12. For example, the lock mechanism 50 may include a movable member 52 that is configured to releasably engage the connector 30. The connector 30 may include a slot 54 (e.g., a circumferentially extending slot) or like engagement member that is configured to be engaged by the movable member 52. In one example where the slot 54 extends about the entire circumference of the connector 30, the movable member 52 may be configured to engage at least half of the circumference of the slot 54. In some instances, the movable member 52 is configured to move laterally within the sensor 12 (i.e., not axially) between locked and unlocked positions. The connector 30 may be configured to engage the sensor 12 in an axial direction perpendicular to the movement of the movable member 52. The movable member 52 may be biased towards a locked position, e.g., with a spring 56. The end of the connector 30 is shaped (e.g., curved) such that inserting the connector into sensor 12 urges the movable member 52 to overcome the spring 56 bias and move towards an unlocked position until the connector is received within the receptacle 32. Once the connector 30 is received within the receptacle 32 of the sensor 12, the spring 56 is then able to bias the movable member 52 back towards the locked position such that the movable member engages the slot 54. Thus, in some cases, the lock mechanism 50 may be configured to automatically lock the connector 30 to the sensor 12 in response to engagement of the connector with the sensor.

Figure 7:
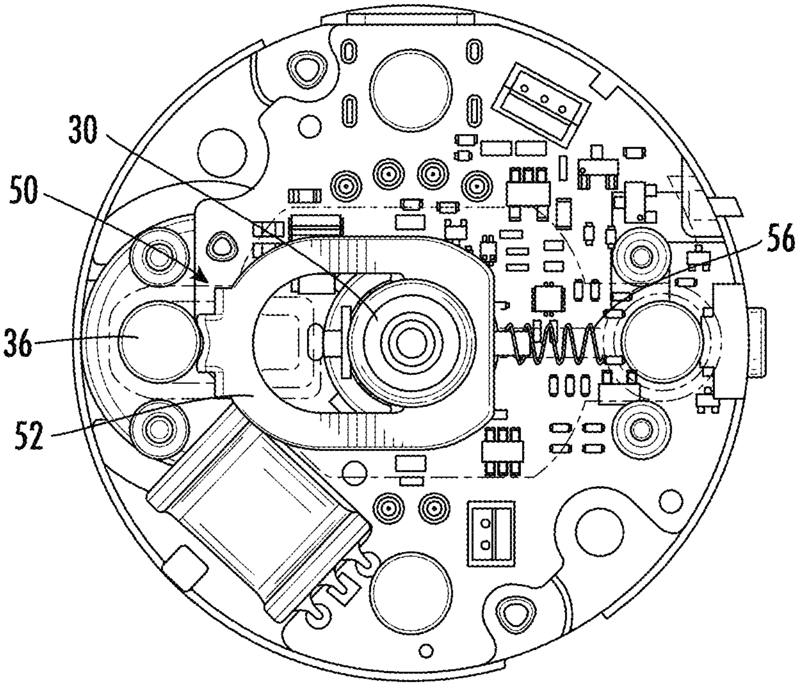
FIG. 7 is a partial view of the sensor shown in FIG. 4.
Figure 8:
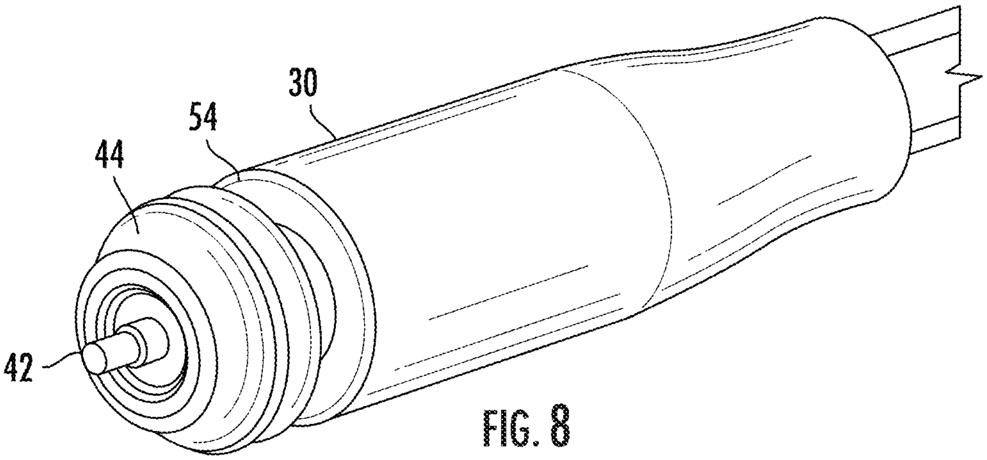
FIG. 8 is a perspective view of a connector at the end of the cable according to one embodiment.

To unlock the lock mechanism 50 to allow removal of the connector 30 from the sensor 12, a key 60 may be necessary, although as described below, in other embodiments the key 60 may not be required to unlock the lock mechanism. In some embodiments, the key 60 is a magnetic key that is configured to attract to one of the magnets 36 on the sensor 12 adjacent to the movable member 52 (see, e.g., FIG. 7). While the magnetic key 60 is magnetically engaged with this magnet 36, a user may then move the magnet and movable member 52 towards the unlocked position and to overcome the bias of the spring 56. In this way, the user is then able to remove the connector 30 from the sensor 12 due to disengagement of the movable member 52 from the connector using the magnetic key 60. The sensor 12 may define a recess 58 or other locating feature that allows the user to locate the magnetic key 60 in the desired location for unlocking the lock mechanism 50. In addition, in some embodiments, the lock mechanism 50 is needed to ensure that an electrical connection between the connector 30 and the sensor 12 is maintained. For instance, without utilization of the lock mechanism 50, the connector 30 cannot remain engaged with the receptacle 32 of the sensor 12. Thus, the combination of electrical contacts 42, 44, 48, 49 of the connector 30 and sensor 12 and engagement of the lock mechanism 50 ensures an electrical connection therebetween.

In other embodiments, the key 60 may be an electronic and/or programmable key configured to communicate with the lock mechanism 50 for locking or unlocking the lock mechanism. This key 60 could communicate with one or more security devices 10 using any desired communication protocol, such as, for example, IR, Bluetooth, WiFi, radiofrequency, or electrical contacts. The key 60 may be a physical key, such as described above, or alternatively may be a smart device or mobile phone configured to communicate with the security device 10 in a similar manner. Thus, the term "key" as used herein may in some cases be any device configured to communicate with the security device 10 for controlling the security device. In one example embodiment, the key 60 may be similar to that disclosed in U.S. Publ. No. 2019/0272731, entitled Programmable Security System and Method for Protecting Merchandise, the entire contents of which are incorporated herein by reference. The key 60 may be configured to selectively communicate with individual security devices 10 or communicate simultaneously with a plurality of security devices.

In some embodiments, security measures could be layered upon the key 60 to ensure that, if stolen, the key could not be used to detach articles of merchandise from security devices 10. For example, the key 60 may be configured to deauthorize itself after a certain amount of time. In addition, the key 60 may require user authentication prior to being authorized to control a security device 10, such as by use of passwords or biometrics.

In a store where there are multiple security devices 10, the key 60 may be configured to control security devices in close proximity to one another (e.g., for locking or unlocking lock mechanism 50 or 50'). For example, the security devices 10 may include a mechanical interface between the key 60 and the security device—such as a port where electronic contacts engage one another or wireless communication is communicated between the key and the security device for authorization. Another example is where the key 60 is configured to communicate with a security device 10 based on wireless proximity such that the key can communicate with and control the nearest security device. Another example is a key 60 having a user interface that allows the user to manually select which security device 10 to control, such as from a map or a list. Yet another example is a key 60 configured to scan an identifier or tag on the security device 10 or article of merchandise (e.g., a QR code) or use image recognition software to determine which security device the retail store associate is attempting to access.

In one embodiment, the lock mechanism 50 or 50' may include a mechanical actuator (e.g., a button) configured to lock or unlock the lock mechanism 50 or 50'. In one example, the mechanical actuator may only be configured to be manually actuated when an authorized key 60 has been presented to the security device 10. Thus, the mechanical actuator would be non-functional until the key 60 successfully communicates with the security device 10. The mechanical actuator may be useful in some cases where a recoiler 22 is employed, as unlocking the cable 20 from the sensor 12 may result in the cable retracting slightly into the base 18, thereby making it difficult to reverse since each lock mechanism 50 or 50' may be required to be relocked only after manually reattaching the cable to the sensor. In this way, given that the mechanical actuator is required to fully release the cable 20 from the sensor 12 and may be operably engaged with the cable, the mechanical actuator may simply be returned to its original position without having to manually reattach each cable to its respective sensor. In some instances, the manual actuator may only be actuatable for a predetermined period of time before the actuator is prevented from releasing the lock mechanism 50 or 50'. In some cases, the key 60 may be configured to communicate with each of the security devices 10, and the sales associate may then be able to actuate the mechanical actuator for unlocking the lock mechanism 50 or 50'. In one embodiment, the security device 10' may be configured to communicate to a remote device 70 (described below) that a cable 20 has been released, and the remote device may in turn communicate a signal back to the security device to relock the lock mechanism 50 or 50'.

In another embodiment, a locking feature may be provided for locking the sensor 12 to the base 18. In this regard and with reference to FIG. 1, a lock mechanism 80 may be configured to lock the sensor 12 to the base 18 when the sensor is seated on the base 18 to thereby prevent the cable 20 from being retracted relative to the base. Such a lock mechanism 80 may be useful for retailers who wish to secure the sensor 12 and item of merchandise to the base 18, such as after hours, since the cable 20 will be inaccessible due to the inability to lift the sensor from the base. In the illustrated embodiment, the lock mechanism 80 includes a locking member 82 that is configured to rotate between locked and unlocked positions. In this instance, the locking member 82 may be operated by a proprietary key, which could be the same key 60 that is used to actuate the lock mechanism 50. In some embodiments, the lock mechanism 80 is similar to that disclosed in U.S. Publication No. 2020/0141159A1, entitled Systems and Methods for Locking a Sensor to a Base, filed on Jan. 4, 2018, the entire contents of which are incorporated herein by reference.

In some embodiments, a lock mechanism 50' and/or other functions of the security device 10 are configured to be remotely actuated or controlled. In this embodiment, the lock mechanism 50' is configured to lock and unlock the end of the cable 20 to or from the sensor 12, similar to that described above with respect to lock mechanism 50. In some cases, the lock mechanism 50' may be configured to operate with a key 60 as disclosed above, although the key may be omitted in some embodiments.

Figure 13:
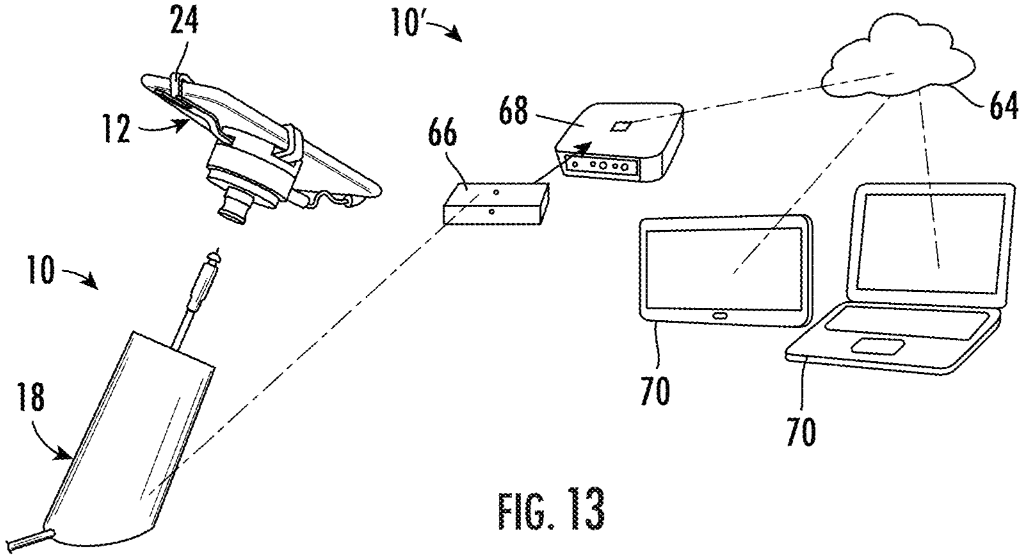
FIG. 13 is a perspective view of a system including a network of security devices and remote devices according to one embodiment.

FIG. 13 shows an embodiment of a system 10' that is part of a network of merchandise security devices 10. According to some embodiments, the network enables communication between a plurality of merchandise security devices 10 and remote devices 70. The network may be cloud-based and include a cloud 64 for facilitating communication between the merchandise security devices 10 and the remote devices 70. Each of the security devices 10 may include a transceiver (e.g., radio) for wirelessly communicating with the remote devices 70, which could reside in the sensor 12 or the base 18. The cloud 64 may facilitate communication with one or more remote devices 70 (e.g., a tablet or computer). The remote devices 70 may be located at any desired location, such as in the same retail store as the security devices 10 or offsite at a location remote from the retail store. In some cases, the remote device 70 may belong to a retail store associate or a backend computer used by a retailer or corporation. The network may be a wireless network optionally including a plurality of nodes 66 that are configured to communicate with one another and/or one or more merchandise security devices 10. The network may be any suitable network for facilitating wireless communication such as, for example, a mesh, star, multiple star, repeaters, IoT, etc. networks. In some cases, the nodes 66 and the security devices 10 may be integrated with one another such that the security device operates as a node. In other cases, the nodes 66 may be omitted, and the security devices 10 communicate with the remote devices 70 via a gateway 68. A gateway 68 or hub or "host" may be employed to allow for or facilitate communication between the one or more security devices 10 and/or the nodes 66 and the cloud 64. In some embodiments, all communication within the network is wireless, such as via radiofrequency signals (e.g., Sub GHz ISM band or 2.4 GHz), Bluetooth, LoRa, and Wi-Fi, although other types of wireless communication may be possible. In some embodiments, the system 10' is similar to that disclosed in International Publication No. WO 2020/227513, entitled Merchandise Display Security Systems and Methods, filed on May 7, 2020, the entire contents of which are incorporated herein by reference.

In one embodiment, commands may be provided remotely for taking various actions. For example, where a theft has occurred, a command may be provided from a remote location or device 70 (e.g., a tablet or computer) to lock and/or unlock all or a portion of the merchandise security devices 10. The remote command could be used to lock or unlock the lock mechanism 50' and/or lock mechanism 80. Similarly, a command may be provided from a remote location or device 70 to deactivate all or a portion of the security devices 10 (e.g., disarm the alarm). Furthermore, in some embodiments, such requests or commands may be made by the remote device 70 for individual security devices 10 or a plurality of security devices (e.g., sending a command to lock all security devices in response to a security event), which may include simultaneously locking or unlocking the lock mechanism 50' and/or lock mechanism 80 of a plurality of security devices. Moreover, one or more of the security devices 10 may be configured to lock or alarm in response to a security event (e.g., automatically locking the lock mechanism 80). As such, the system 10' provides techniques for centralized security and control of the merchandise security devices 10 and other components within the system.

Figure 12:
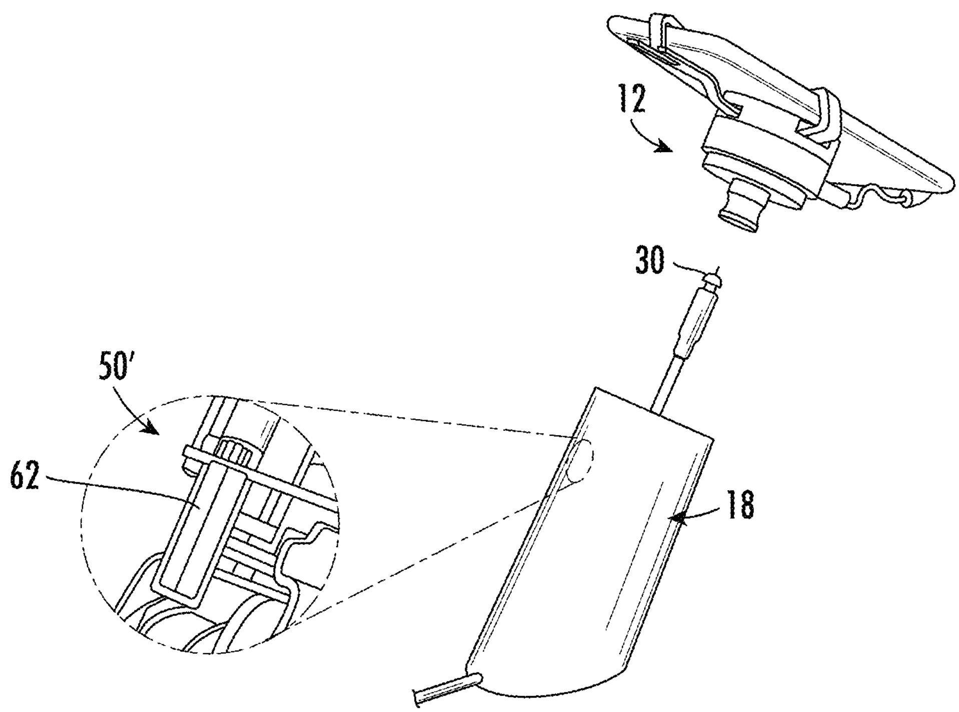
FIG. 12 is a perspective view of a security device and a detailed view of a lock mechanism according to one embodiment.

In one embodiment, the lock mechanism 50' may be actuated using a remote device 70 for engaging and/or disengaging the connector 30 from the sensor 12. For example, FIG. 12 shows that the lock mechanism 50' may include a motor 62 that is configured to be actuated by a command provided from a remote device 70 to lock or unlock the lock mechanism. In some cases, the motor 62 may be configured to actuate the movable member 52 for disengaging the connector 30. In other embodiments, the lock mechanism 50' may include a magnet that is configured to interact with the magnet 36 to mimic the function of the magnetic key 60. Thus, actuation of the lock mechanism 50' may facilitate movement of the movable member 52 to an engaged or disengaged position. The lock mechanism 50' may include any suitable mechanism for facilitating disconnection of the connector 30 from the sensor 12, such as any combination of mechanical and/or electrical means (e.g., springs, solenoids, motors, magnets, nitinol actuators, etc.).

It is understood that the lock mechanism 50' may reside in either the sensor 12 or the base 18 for disengaging the connector 30 from the sensor 12. For example, the motor 62 (or like mechanism) could be housed in either the sensor 12 or the base 18 for actuating the lock mechanism 50. It is further understood that the lock mechanism 50' could be actuated when the sensor 12 is lifted from the base 18 or resting on the base 18. In the embodiment where the lock mechanism 50' resides in the base, the lock mechanism 50' may be actuated when the sensor is resting on the base, while in the embodiment where the lock mechanism 50 resides in the sensor, the lock mechanism 50' may be actuated when the sensor is lifted from the base or resting on the base. In still other embodiments, the lock mechanism 50' may be housed by both the sensor 12 and the base 18, such as where some components of the lock mechanism are located in the sensor and the base, e.g., the movable member 52 is housed within the sensor while the mechanism (e.g., motor 62) for releasing the movable member is housed in the base. In another embodiment, the lock mechanism 50' and the lock mechanism 80 may be configured to actuated simultaneously using one or more commands from the remote device 70. Additionally, in some cases the lock mechanism 50' and the lock mechanism 80 may be integrated into a single assembly for locking or unlocking the sensor 12 on the base and/or engaging or disengaging the movable member 52 from the connector 30.

Figure 14:
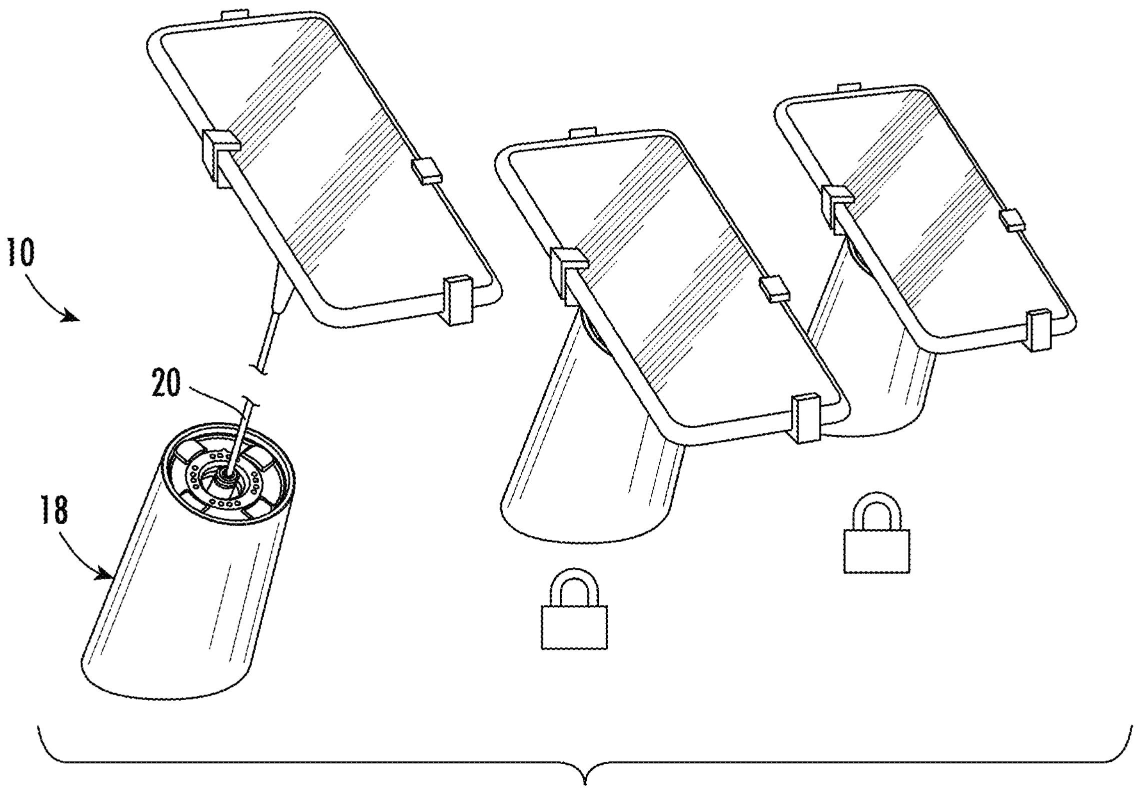
FIG. 14 is a perspective view of a system including a plurality of security devices according to one embodiment.

Moreover, the lock mechanism 50' and/or the lock mechanism 80 may be remotely actuated based on various criteria. As discussed above, a command from a remote device 70 may cause actuation of the lock mechanism 50'. In some cases, the lock mechanism 50' may be automatically actuated based on a predetermined schedule. For example, the retailer may program the remote device 70 to send a command to lock or unlock the lock mechanism 50' and/or the lock mechanism 80 at a particular time of day. For instance, a retailer may wish to unlock all lock mechanisms 50' at the end of business hours so that the merchandise can be locked away in a back room or remerchandised. In other cases, the lock mechanism 50' may be actuated in response to a security event associated with another security device 10 in the system 10'. FIG. 14 shows an example where a plurality of security devices 10 are locked in response to a security event (e.g., the cable 20 being cut on one of the security devices). Similarly, the retailer may wish to lock all of the lock mechanisms 80 after hours for additional security. In still other examples, the lock mechanism 50' and/or the lock mechanism 80 may be configured to be automatically locked upon the sensor 12 being positioned on the base 18. For example, a retailer may permit a consumer to lift an item of merchandise and associated sensor 12 from the base 18, such as by first sending a command from a remote device 70 to unlock the lock mechanism 80, and lock mechanism 80 may be configured to subsequently detect (or be instructed based on a detection by the sensor 12 or the base 18) placement of the sensor back on the base to relock the sensor on the base. In other cases, other than the lock mechanism 80 that receives a command to unlock, all other lock mechanisms 80 of the remaining security devices 10 on display may remain locked. In one embodiment, the lock mechanism 50' and/or the lock mechanism 80 may be configured to unlocked for a predetermined period of time prior to being relocked and/or the alarm being re-armed. In other words, after the predetermined period of time elapses, the lock mechanism 50' and/or the lock mechanism 80 will automatically relock and/or the alarm will automatically re-arm. Thus, any one or more of the lock mechanisms 50' and/or the lock mechanism 80 for any one or more security devices 10 may be locked or unlocked depending on the retailer's preferences.

Figure 15:
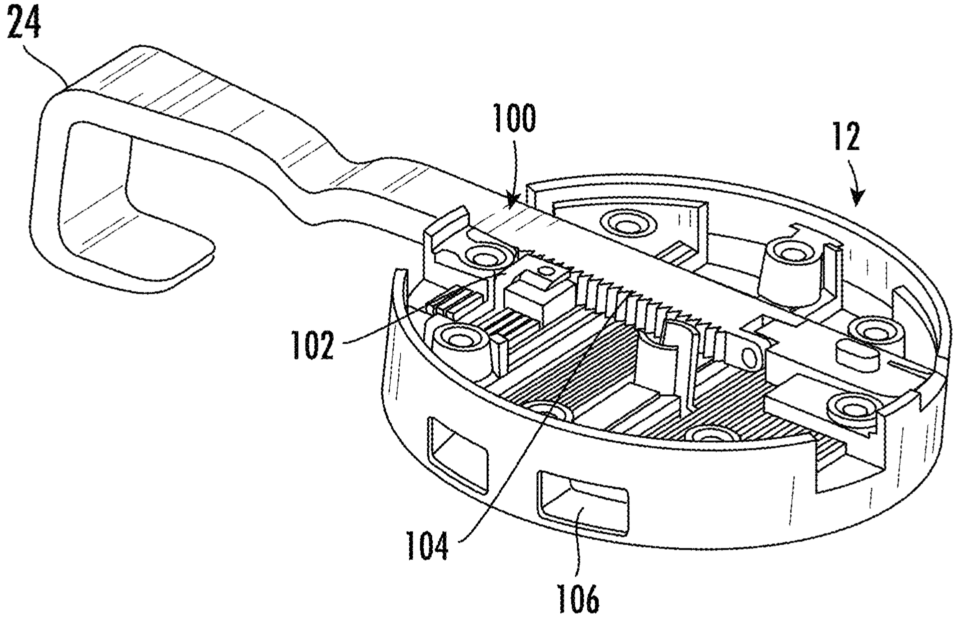
FIG. 15 is a partial perspective view of a sensor and a releasable mechanical bracket according to one embodiment of the present invention.
Figure 16:
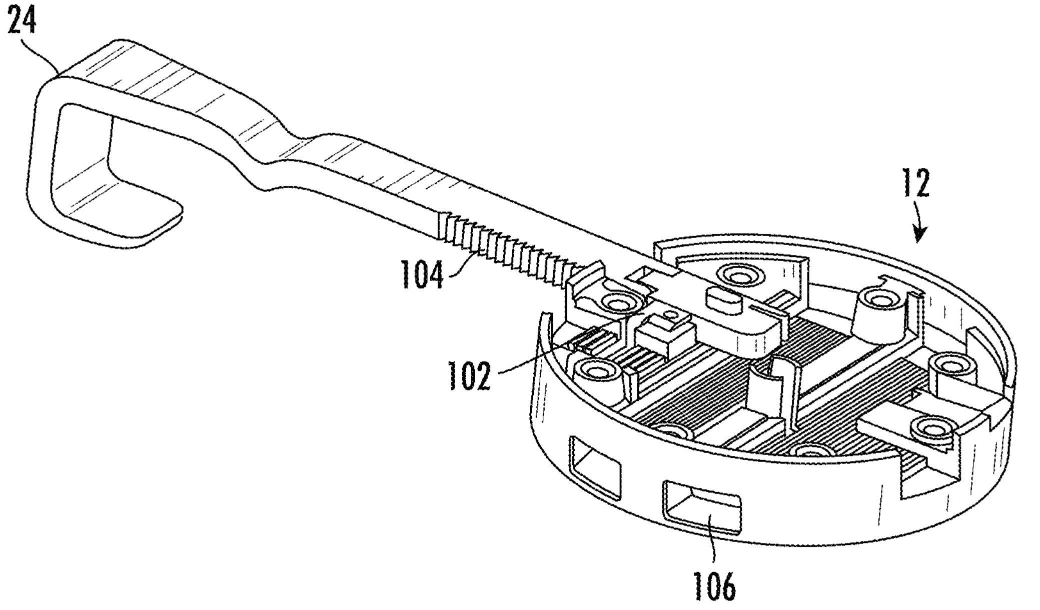
FIG. 16 is a partial perspective view of the sensor shown in FIG. 15 with the mechanical bracket in an unlocked state.
Figure 17:
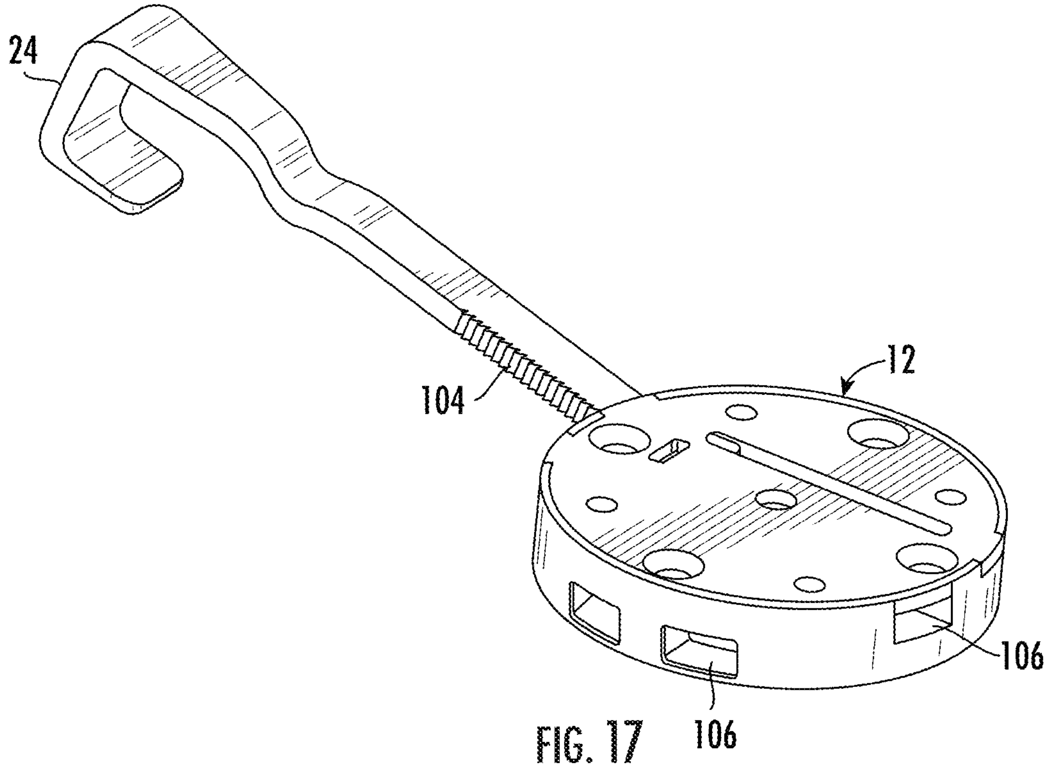
FIG. 17 is a perspective view of the sensor shown in FIG. 15 with the mechanical bracket in an unlocked state.

In another embodiment, a lock mechanism 100 may be utilized for unlocking one or more mechanical brackets 24 as shown in FIGS. 15-17. Often phones are on display using bracket arms to enhance the security of the device versus only having adhesive to hold the phone to the sensor. This creates a problem when a potential client wants to examine the phone without limitation (e.g., to test size the phone in the client's pocket). Removal of conventional bracket arms typically involve a cumbersome mechanical process involving tools and is not fast enough to realistically remove the phone for a customer to handle. Thus, in some embodiments of the present disclosure, a key 60 or remote device 70 as described above may be used in a similar manner to release the mechanical brackets 24 from the article of merchandise. Thus, the various features discussed above, such as the lock mechanisms 50, 50', 80, may be used or otherwise applied to the embodiments for locking or unlocking one or more mechanical brackets 24, including in response to communication with a key 60 and/or remote device 70.

In some embodiments, a plurality of mechanical brackets 24 may be used to secure the article. However, in some cases, only one mechanical bracket is required to be released in order to remove the article from the sensor 12. Each mechanical bracket 24 may be in the form of an arm with a U-shaped end configured to receive a portion of the article therein, although other bracket configurations may be used. The sensor 12 may include one or more slots 106 that are configured to receive a respective mechanical bracket 24 therein. As shown in FIGS. 15-17, a single mechanical bracket 24 may be configured to be released. For example, the lock mechanism 100 may include a locking pawl 102 with engagement teeth that are configured to engage and disengage corresponding engagement teeth 104 on the mechanical bracket. Thus, when the engagement teeth are in engagement with one another, the mechanical bracket 24 cannot be moved relative to the sensor 12. The mechanical bracket 24 may be at least partially removable from the sensor 12 when the engagement teeth disengage one another. The locking pawl 102 may be configured to be moved in response to receiving an electronic signal (e.g., via key 60 or remote device 70), such as, for example, by a motor, solenoid, or a shape memory material or like actuator. A spring or like mechanism could be used to allow the mechanical bracket 24 to automatically bias to a disengaged position, or the user could manually move the mechanical bracket once the lock mechanism 100 is unlocked. In some cases as shown in FIG. 17, the movable mechanical bracket 24 may be configured to remain in engagement with the sensor 12 even in an unlocked state. The remaining mechanical brackets 24 may be removable from the sensor in a conventional manner but may remain in position even when the lock mechanism 100 is unlocked. Once the movable mechanical bracket 24 is moved to a disengaged position, the end of the mechanical bracket 24 that engages the article of merchandise may be moved out of the way so that the article can slide out of engagement with the other mechanical brackets. In some embodiments, the movable mechanical bracket 24 may be configured to pivot downwardly relative to the sensor 12 to allow removal of the article. In the case where the sensor 12 includes a sensing device 15, such as a pressure or plunger switch, as described above, the sensing device in this implementation may have an angled top surface to allow the article to slide relative to the sensor and to depress the sensing device without shearing off the sensing device.

The foregoing has described one or more embodiments of merchandise security systems, devices, and methods for displaying and protecting an article of merchandise from theft. Those of ordinary skill in the art will understand and appreciate that numerous variations and modifications of the invention may be made without departing from the spirit and broad scope of the invention. Accordingly, all such variations and modifications are intended to be encompassed by the appended claims.

That which is claimed is:

1. A merchandise security system for displaying and protecting an article of merchandise from theft, comprising:
a security device comprising:
a sensor configured to be secured to the article of merchandise, the sensor configured to detect a security event;
a base for removably supporting the sensor and the article of merchandise thereon;
a cable configured to releasably engage the sensor and to secure the sensor relative to the base;
a plurality of mechanical brackets configured to engage the article of merchandise and the sensor and to secure the article of merchandise to the sensor in a locked position; and
a lock mechanism housed within the sensor, the lock mechanism configured to lock one of the plurality of mechanical brackets in the locked position and to be disengaged for allowing removal of the article of merchandise from the sensor when the one of the plurality of mechanical brackets is in an unlocked position and the remaining plurality of mechanical brackets remain in engagement with the article of merchandise, and
an electronic device configured to wirelessly communicate with the security device, wherein the electronic device is configured to transmit a command to the security device for locking or unlocking the lock mechanism.

2. The merchandise security system of claim 1, further comprising a second lock mechanism configured to lock the cable to the sensor in a locked position and to release the cable from the sensor in an unlocked position.

3. The merchandise security system of claim 2, wherein the cable further comprises a connector at an end of the cable for releasably engaging the sensor.

4. The merchandise security system of claim 3, wherein the connector is configured to rotate relative to the sensor while being in electrical communication therewith.

5. The merchandise security system of claim 3, wherein the connector is configured to axially engage the second lock mechanism.

6. The merchandise security system of claim 1, further comprising a recoiler operably coupled to the cable and configured to facilitate extension and retraction of the cable.

7. The merchandise security system of claim 1, wherein the cable is configured to be extended from the base in response to the sensor being lifted off of the base, and wherein the cable is configured to be retracted into the base in response to the sensor being moved to a seated position on the base.

8. The merchandise security system of claim 7, further comprising a second lock mechanism for locking the sensor on the base.

9. The merchandise security system of claim 8, wherein the electronic device is configured to transmit a command to the security device for locking or unlocking the second lock mechanism.

10. The merchandise security system of claim 1, wherein the electronic device is a key.

11. The merchandise security system of claim 1, wherein the electronic device is a remote device.

12. The merchandise security system of claim 1, wherein the electronic device is a mobile phone or tablet.

13. The merchandise security system of claim 1, further comprising a plurality of electronic devices configured to wirelessly communicate with the security device, at least one of the electronic devices being an electronic key and at least one other of the electronic devices being a remote device.

14. The merchandise security system of claim 1, wherein the lock mechanism comprises a movable member configured to move laterally between the locked and unlocked positions.

15. The merchandise security system of claim 1, wherein the electronic device is configured to transmit a command to the security device for locking the lock mechanism.

16. The merchandise security system of claim 1, wherein the electronic device is configured to transmit a command to the security device for unlocking the lock mechanism.

17. The merchandise security system of claim 1, wherein the security device and the electronic device are arranged in a wireless cloud network for communicating with one another.

18. The merchandise security system of claim 1, further comprising a plurality of security devices each comprising a lock mechanism, wherein the electronic device is configured to communicate with each of the plurality of security devices for locking or unlocking the lock mechanism associated with each of the security devices.

19. The merchandise security system of claim 1, wherein the lock mechanism comprises a motor.

20. The merchandise security system of claim 1, wherein the lock mechanism is configured to be actuated via engagement with a key.

21. The merchandise security system of claim 1, wherein the lock mechanism is configured to be actuated without interaction with a key.

22. The merchandise security system of claim 1, wherein the lock mechanism is configured to be automatically locked or unlocked after a predetermined period of time or according to a predetermined schedule.

23. The merchandise security system of claim 1, further comprising a spring configured to bias the one of the plurality of mechanical brackets from the locked position to the unlocked position.

24. The merchandise security system of claim 1, further comprising a locking pawl configured to engage corresponding engagement teeth defined on the one of the plurality of mechanical brackets in the locked position and to disengage the corresponding engagement teeth in the unlocked position.

25. The merchandise security system of claim 1, wherein the one of the plurality of mechanical brackets is configured to remain in engagement with the sensor in the unlocked position.

26. The merchandise security system of claim 1, wherein the one of the plurality of mechanical brackets is configured to pivot between the locked position and the unlocked position.

27. A method for displaying and protecting an article of merchandise from theft, comprising:
securing a sensor to the article of merchandise, the sensor configured to detect a security event, wherein a plurality of mechanical brackets are configured to engage the article of merchandise and the sensor and to secure the article of merchandise to the sensor in a locked position;

releasably attaching a cable to the sensor so as to secure the sensor relative to a base, the base configured to removably support the sensor and the article of merchandise thereon;

locking one of the plurality of mechanical brackets to the sensor with a lock mechanism in the locked position, the lock mechanism being housed by the sensor; and causing the lock mechanism to move from the locked position to an unlocked position for removing the article of merchandise from the sensor in response to receiving a wireless command from an electronic device for releasing the one of the plurality of mechanical brackets from the sensor while the remaining plurality of mechanical brackets remain in engagement with the article of merchandise.

* * * * *